United States Patent

[11] 3,583,428

| [72] | Inventor | Gail Cornelius |
| | | Portland, Oreg. |
| [21] | Appl. No. | 805,664 |
| [22] | Filed | Mar. 10, 1969 |
| [45] | Patented | June 8, 1971 |
| [73] | Assignee | R. M. Wade & Co. |
| | | Portland, Oreg. |

[54] LATERALLY MOVING AUTOMATIC IRRIGATION SYSTEM
17 Claims, 5 Drawing Figs.

[52] U.S. Cl. .................................................... 137/344,
239/212, 239/178
[51] Int. Cl. ................................................... B05b 9/02,
E01h 3/02
[50] Field of Search ........................................... 239/212,
213, 178, 191, 189; 137/344

[56] References Cited
UNITED STATES PATENTS
| 2,726,895 | 12/1955 | Behlen | 239/155 |
| 3,101,903 | 8/1963 | Hall | 239/189 |

*Primary Examiner*—Lloyd L. King
*Assistant Examiner*—Edwin D. Grant
*Attorney*—Fryer, Tjensvold, Feix, Phillips and Lempio

ABSTRACT: An irrigation system including a long line with spaced irrigation water outlets, the line being mounted on spaced sets of wheels to enable it to be moved across a field in a direction normal to its length to irrigate the field as it moves. The line is moved by power means at one of its ends which includes a winch for slowly winding in a cable that is anchored across the field. Special means are employed for driving and controlling the several sets of wheels to maintain the line relatively straight and at a right angle to the direction of movement of the power means at its end.

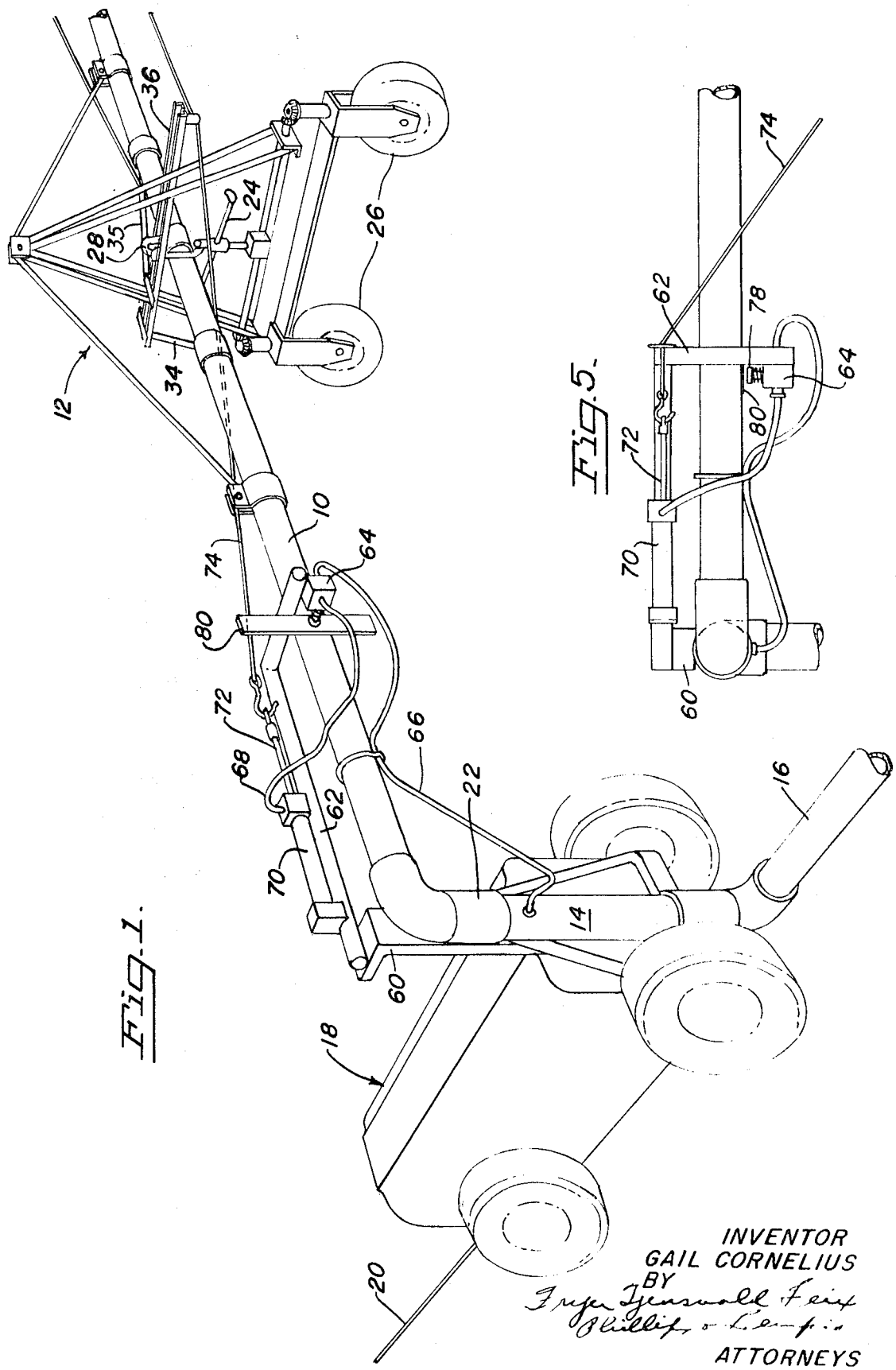

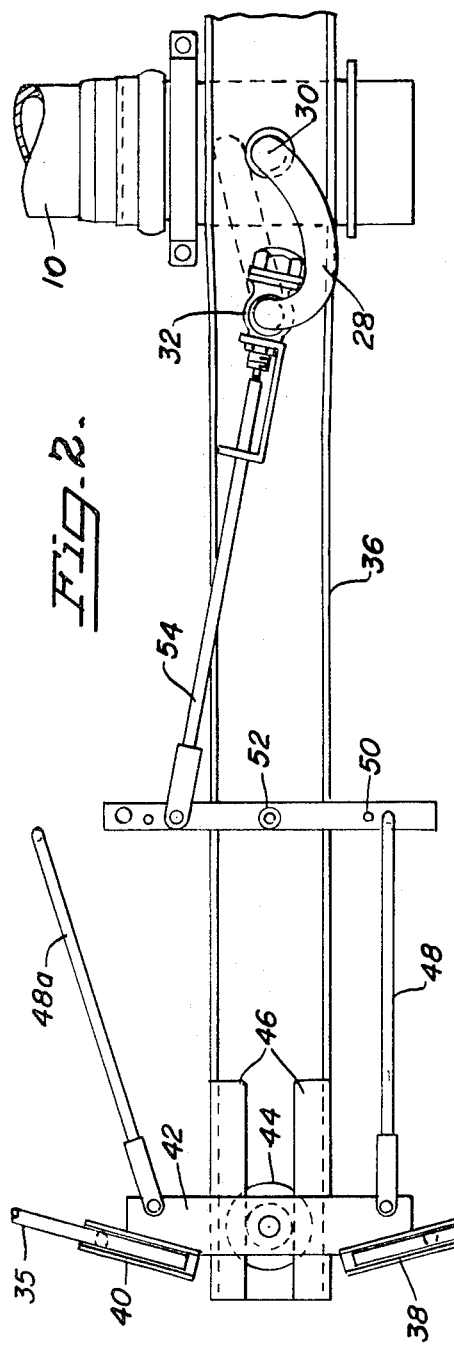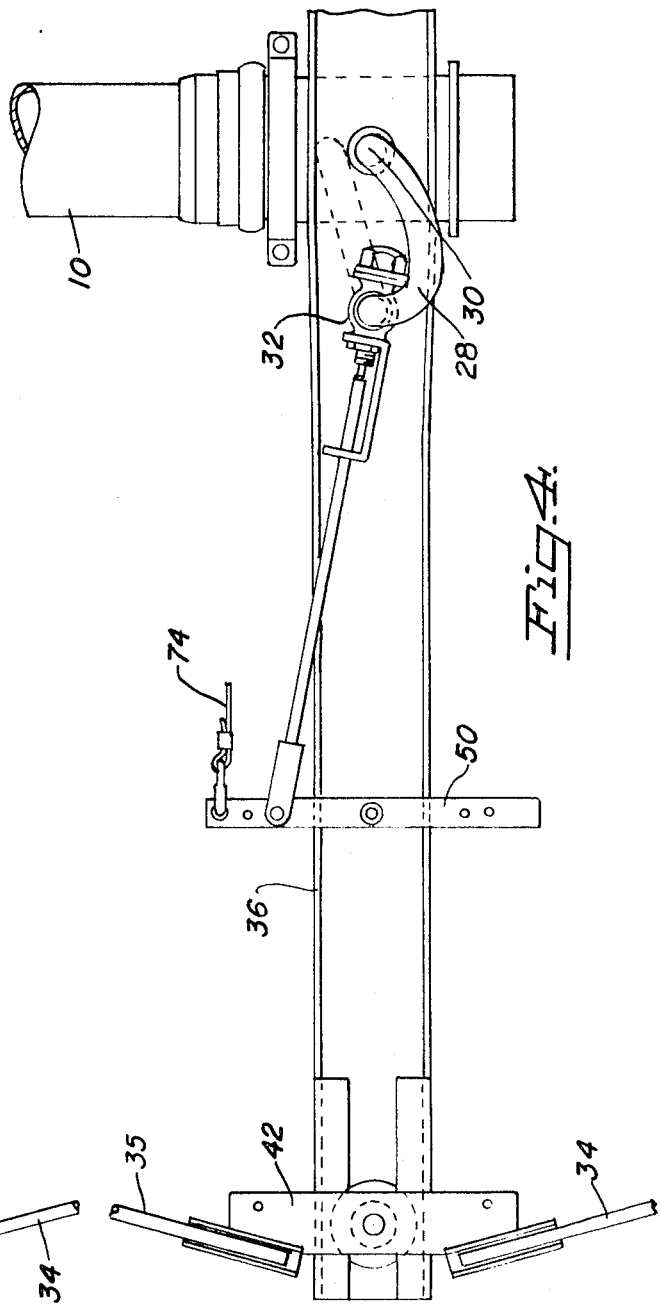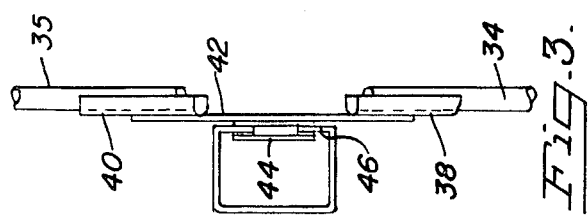

LATERALLY MOVING AUTOMATIC IRRIGATION SYSTEM

The invention disclosed herein relates to controls for the drive of an irrigation line of which the actual drive gearing and other related features are disclosed in my copending application entitled "Wheel and Drive Means for Irrigation Sprinkler System," filed March 10, 1969, Ser. No. 805,706.

Sprinkler-type irrigation has been recognized for many years as superior in several ways to irrigation by flooding. When moveable sprinkler irrigation lines were first employed, they were made of coupled lengths of pipe disposed in one position until desired wetting of the field had been accomplished. They then had to be drained, uncoupled and set up in an advanced position and so on, until the entire field was irrigated. To reduce the high cost of manpower required in such procedure where the areas to be irrigated were very extensive, the line was mounted on wheels and periodically advanced by a power unit generally employing a small gasoline engine. Since many lines are a quarter of a mile in length and the power unit was in the center while the water supply to be disconnected and reconnected was at one end, each move required a great deal of walking and time.

Many efforts have been made to provide a sprinkler system that moves slowly but continuously without any attention until an entire area of many acres has been suitably irrigated. This gave rise to the problem of supplying water under pressure to a moving line. One solution was to employ a central water source with a radially extending line rotating about the source. This, of course, irrigated a circular plot and did not cover the corners of a rectangular field. It also had other objectionable features as do other systems which were tried.

Some systems were developed to move a line laterally across the field and with the advent of new extremely durable hose, water was fed to one end of the line as the supply hose was dragged on the ground. Here again, difficulties were encountered in trying to keep the line straight and at a right angle to the direction of travel. Even driving all wheels at the exact same speed is not effective because the terrain varies and the wheel on flat ground moves ahead faster than that on undulating terrain.

The present invention overcomes all of the several difficulties recited above and provides a dependable irrigation system capable theoretically of moving forwardly on a straight course without attention for an endless period of time and limited only by the length of the flexible hose from which it derives its supply of water.

The invention will be more fully understood by reading the following specification wherein it is described in detail by reference to the accompanying drawings.

In the drawings:

FIG. 1 is a perspective view of one end of an irrigation line embodying the present invention showing the power means for driving the line and illustrating the general construction of one of the towers from which the driven wheeled supports for the line;

FIG. 2; is a view looking down on a part of the line and one side of one of the towers which includes the control means for a water motor on the tower;

FIG. 3 is a view in end elevation looking from the left end of FIG. 2 of a part of the control means for the water motor;

FIG. 4 is a view like FIG. 2 but shows the control means on the very end tower which differs from the several towers which support the line; and FIG. 5 is a fragmentary detail of a part of the mechanism shown in FIG. 1.

As shown in FIG. 1, a sprinkler line, a part of which is shown at 10 is supported by a plurality of spaced towers having driving wheels on them, one tower being generally indicated at 12. Water to the line 10 is supplied through a riser 14 which is in turn supplied by a length of flexible hose, a part of which is shown at 16. With such a hose connected to a stand pipe or other source of water under pressure midway of the area over the system is to pass, the line can travel approximately twice the length of the hose without attention. Initial movement is imparted to the line 10 by a Water Winch, which is a machine currently available for this purpose and shown generally at 18 in FIG. 1. This machine is powered with a gasoline engine which drives a winch or reel at a greatly reduced speed to take in a cable shown at 20, the other end of which is anchored at the opposite end of the area to be irrigated. The Water Winch is, in effect, a tractor which carries one end of the main line 10. The riser 14 is secured to the back of the Water Winch and connected as by a swivel joint 22 with the horizontal line 10.

Generally speaking, the operation of the system is as follows: The tractor moves forwardly at a governed rate of speed until bending of the pipe takes place between the swivel 22 and the first tower 12. This bending of the pipe imparts opening movement, through mechanism to be described, to a valve which supplies water from the pipe to a rotary water motor 24 carried by the tower. This motor imparts driving power to the wheels shown at 26 as described in the copending application referred to above. Thus the first tower 12 starts to move forwardly and imparts a bend in the pipe 10 between the first and second towers and this continues on from tower to tower until the forward movement of the supply end of the pipe 10 has reached a point where it transmits a signal to the very last tower at the opposite end of the pipe. This signal opens the valve on the last tower for driving its water motor imparting motion to the tower at a speed which is greater than and preferably twice that of the tractor 18. As the last tower advances, it tends to straighten the curved pipe brining the motors on the several towers to rest successively in progression from the last or control tower toward the tractor 18. This brings the line, which was slightly lagging throughout its length, to an advanced position which is slightly ahead of normal where it is approximately 90° to its direction of travel and causes closing of the valve and stopping of the motor on the last or control tower. The tractor 18, which meanwhile has been moving forwardly at half the speed of the control tower end of the line, again tends to impart a slight bend or curve to the line through progressively energizing the water motors on the towers.

The mechanism for starting the motors on the individual towers is best shown in FIGS. 1, 2 and 3. In FIG. 1, a hose 28 connects an outlet 30 in a pipe 10 with a valve 32 (See FIG. 2) which controls flow of water under pressure to the motor 24. The pipe 10 is suspended from a cross member 36 on the tower and the valve 32 is also carried by this cross member. Extending between the pipe 10 on opposite sides of the tower are a pair of rods 34 and 35, the outer ends of which are secured through saddles 38 and 40 respectively (see FIG. 2 and FIG. 3) to a bar 42. This bar is disposed transversely of the beam 36 and is guided for sliding movement to and away from the pipe 10 by a guide roller 44 operating between the tracks 46. Because of this arrangement, bending of this type causes a bar 42 to move toward and away from the pipe depending upon the direction in which it is bent. For example, when the pipe bends forwardly as upon forward movement of the tractor 18, the bar 42 will be moved outwardly and away from the pipe and through a link 48 will move a lever 50 about its pivot 52 and cause a push rod 54 to open valve 32 which is of a known plunger actuated type. Thus the motor on the first tower is started to drive the tower forwardly, bending the pipe between it and the next tower and progressively moving the pipe forwardly until it attains a position where the very last or control tower is started. When the line is operating in the opposite direction, that is with the tractor 18 connected to the other side, the valves 32 are opened upon bending of the pipe in the opposite direction, and this is accomplished by substituting a link 48a for the link 48 which is connectable to the opposite side of the lever 50. The reason for providing two links instead of moving one from side to side is that the links are adjusted to provide the precise degree of opening of the valve which they control. Thus, with each link properly adjusted, no further adjustment is necessary upon changing the links for drive in opposite directions. Furthermore, it is often necessary to reverse directions of operation because of the shape of the area to be irrigated and the locations of the outlets from which water under pressure is supplied.

The mechanism for energizing the water motor of the end or master tower is illustrated in FIGS. 1, 2, 4 and 5. In FIG. 1 and 5, a bracket is shown as having a vertical member 60 which is rigidly secured to the back of the tractor 18 and carries a fixed angular bracket 62 to the outer end of which is affixed a three-way valve 64, all of which parts constitute a reference device. Water under pressure is supplied to this valve through a line 66 which taps the riser 14 and the valve controls flow of pressure through a line 68 to a cylinder 70 disposed on the bracket 62. The cylinder has a piston within it and a rod 72 projecting from its end and, upon retraction of the rod, a cable 74 suitably connected to the end of the rod is pulled toward the tractor end of the line 10. This line is guided through suitable fair-leads at the ends of the cross beams 36 on all of the towers until it reaches the control tower of which the cross member 36 is shown in FIG. 4. In this FIG., it is seen that the end of line 74 connects with lever 50 so that retraction of the line caused by the piston and cylinder 70 swings the lever 50 clockwise, as viewed in FIG. 4, and opens the valve 32. This valve is adjusted to supply sufficient water to the water motor on the last tower for driving the tower at twice the speed of the tractor 18 as previously described. The control tower is shown as having the same rods 34, 35 and plate 42 as the other towers and this is to enable it to be converted to an intermediate tower when it is desired to increase the length of the system, and all towers are readily convertible from one type to the other.

Referring back to FIGS. 1 and 5, the valve 64 is shown adapted to be opened by depression of a plunger 78 which is engageable with an actuator plate 80 fixed as by welding to the side of the pipe 10. The valve is normally closed and as the pipe angles forwardly about the swivel 22 when the tractor 18 progresses on a straight line, the valve will move toward the pipe until engagement with the plate 80 opens it. This directs fluid under pressure through lines 66 and 68 to the rod end of the cylinder 70 causing retraction of the rod which exerts the retracting force on cable 74 and opens the valve to the motor of the last tower. After the line advances in response to operation of the control tower, the line is again straightened and the valve 64 permitted to close. Being a three-way valve, this opens the passage within the valve between lines 68 and atmosphere to drain water from the jack 70 as the piston 72 is again extended to its outermost position. This extension can be accomplished by any suitable spring means as, for example, a spring contained within the cylinder 70 behind the piston.

Through the means described, the main distribution line 10 is maintained substantially straight and at an angle of substantially 90° to the direction of its travel as it moves across an area being irrigated.

The system is illustrated with the water motors on the towers acting as sprinklers since they cast water outwardly to cover a large circle. Other types of sprinklers may be employed particularly if some driving force other than water motors is used. In fact, the entire length of the pipe may be perforated if desired to drip water on the ground at a rate to cause the proper degree of irrigation to be realized.

The system has been described as having a tractor and a line extending from the tractor in one direction with drive means and controls for the end tower as well as for intermediate towers. There will be cases where the configuration of the area to be irrigated will make it preferable to have a line extending in opposite directions from the tractor with controls similar to the first line. This can readily be accomplished with the control mechanisms herein disclosed.

I claim:

1. An irrigation system comprising a long water line, a tractor supporting and adapted to move the line at one position along said line, mobile towers supporting the line at spaced intervals throughout its length, drive means at each tower and operated by pressure of water from within the line, a valve at each tower controlling said water and means responsive to bending of the line adjacent each tower for opening said valve, a tower drive means near an end of said line remote from said tractor, the valve on the tower at the remote end of the line being opened in response to a water pressure actuated device adjacent the tractor responding to a predetermined forward movement of the tractor, said drive means moving its tower at least as fast as the tractor to cause intermittent movement of the line toward alignment in a position normal to its direction of movement.

2. The system of claim 1 in which the device is a hydraulic cylinder with a retractable piston, a valve to admit water to the cylinder to retract the piston, and a flexible member connecting the piston with the valve for the motor at the opposite end of the line.

3. The system of claim 1 in which said valve to admit water to the cylinder is actuated upon forward movement of the line caused by movement of the tractor.

4. An irrigation system comprising a long water line having a first end and a remote second end thereof, water dispersing members affixed to and spaced along said line, a water source supplying water to the line, tractor means at one position therealong and adapted to move the line in a predetermined direction, mobile tower means supporting the line at spaced intervals along its length, drive means at each tower adapted to move the tower and supported line in a predetermined direction, alignment means at each tower for starting and stopping said drive means, at least one master mobile tower means adjacent the line ends remote from said tractor means and adapted to move the line in a predetermined direction, means connecting the tractor to the water line, control means connected to said tractor and adapted to detect misalignment of said line away from a position normal to the tractor's direction of travel, and signal means responsive to said control means causing said master tower to stop and start its movement to align said water line to a position normal to the tractor's direction of movement.

5. The system of claim 4, in which the tractor has a power driven winch to reel in a cable anchored ahead of the tractor in the direction that the system is to be moved.

6. The system of claim 5 in which the tractor pulls a flexible hose which directs water under pressure to said line.

7. The system of claim 4 in which the means responsive to bending of the line comprises a rigid rod on each side of each tower, said rods converging to a member on the tower to move the member to and away from the line as it bends, and linkage between said member and the valve which controls the drive means.

8. The irrigation system of claim 4, wherein said tractor means moves at a preselected speed in the predetermined direction said master tower, when moving, proceeds at a speed at least faster than the speed of said tractor means.

9. The irrigation system of claim 4 in which the drive means are operated by water pressure from within the line.

10. The irrigation system of claim 4 wherein the control means includes a reference device affixed to said tractor, and an actuator for the reference device affixed to said water line at a position to contact the reference device when said line is misaligned away from a position normal to the tractor's direction of travel.

11. The control means of claim 10 wherein the reference device comprises a valve positioned with respect to said tractor and the actuator is a valve contacting means affixed to said pipe.

12. The irrigation system of claim 4 wherein the means connecting said tractor to said line includes a swivel joint in the water line.

13. In an irrigation system which includes a long line carried on spaced sets of wheels and support structures therefor, drive means for each set of wheels, and adjusting linkage actuated by bending of the line to actuate the drive means to cause the line to advance in a substantially straight condition, said linkage including a lever pivoted intermediate the ends thereof to said support structure and actuating the drive means, the improvement which comprises two separate links for connection alternately to said lever at respective alternate ends thereof in said linkage for use when the line is advancing in opposite directions.

14. In an irrigation system including a long line of pipe with water outlets disposed therealong and mobile propelling members supporting said pipe at spaced intervals including a tractor member at one end of the line and a master mobile member remote from said tractor member, all adapted to move the pipe in a predetermined direction, the improvement comprising control means referenced to said tractor member and adapted to detect deviation of said pipe away from a direction normal to the tractor's direction of travel, and signal means responsive to said control means communicating with said master mobile member to vary its movement to align said pipe to a position normal to the tractor's direction of travel.

15. In a mobile irrigation system comprising a double ended line of irrigation pipe with means supporting said pipe and adapted to move said line laterally across a field, first mobile means connected to said pipe at one end thereof and powered to move continuously in said lateral direction, and second mobile means at another position along said pipe remote from said first mobile means, said second mobile means responsive to the angular relationship of said irrigation pipe to said first mobile means to intermittently move said pipe in cooperation with said first mobile means whereby said entire line of pipe moves in a direction laterally across said field.

16. The mobile irrigation system of claim 15 wherein said second mobile means, when moving, proceeds at a speed greater than the speed of said first mobile means.

17. In an irrigation system including a long line of pipe with water outlets disposed therealong and mobile propelling members supporting said pipe at spaced intervals including a tractor member at one position on said line, all said members adapted to move the line of pipe in a predetermined direction, the improvement comprising control means connected to said tractor member and adapted to detect deviation of said line of pipe next adjacent said tractor member away from an angle of approximately 90° from the tractor member's line of movement.

PO-1050
(5/69)

UNITED STATES PATENT OFFICE
CERTIFICATE OF CORRECTION

Patent No. 3,583,428                 Dated June 8, 1971

Inventor(s)          Gail Cornelius

It is certified that error appears in the above-identified patent and that said Letters Patent are hereby corrected as shown below:

Column 1, line 55, delete "from which" and insert -- which form -- .

Column 2, line 28, delete "brining" and insert -- bringing -- ; column 2, line 53, delete "this type" and insert -- the pipe -- .

Column 4, line 14, delete "claim 1" and insert -- claim 2 -- ; column 4, line 51, after "direction" insert -- and -- .

Column 6, line 18, after "90" insert a degree sign -- ° -- .

Signed and sealed this 29th day of February 1972.

(SEAL)
Attest:

EDWARD M. FLETCHER, JR.                ROBERT GOTTSCHALK
Attesting Officer                      Commissioner of Patents